Nov. 20, 1951     F. FISHER     2,575,948
BALING WIRE CUTTER
Filed Aug. 24, 1946
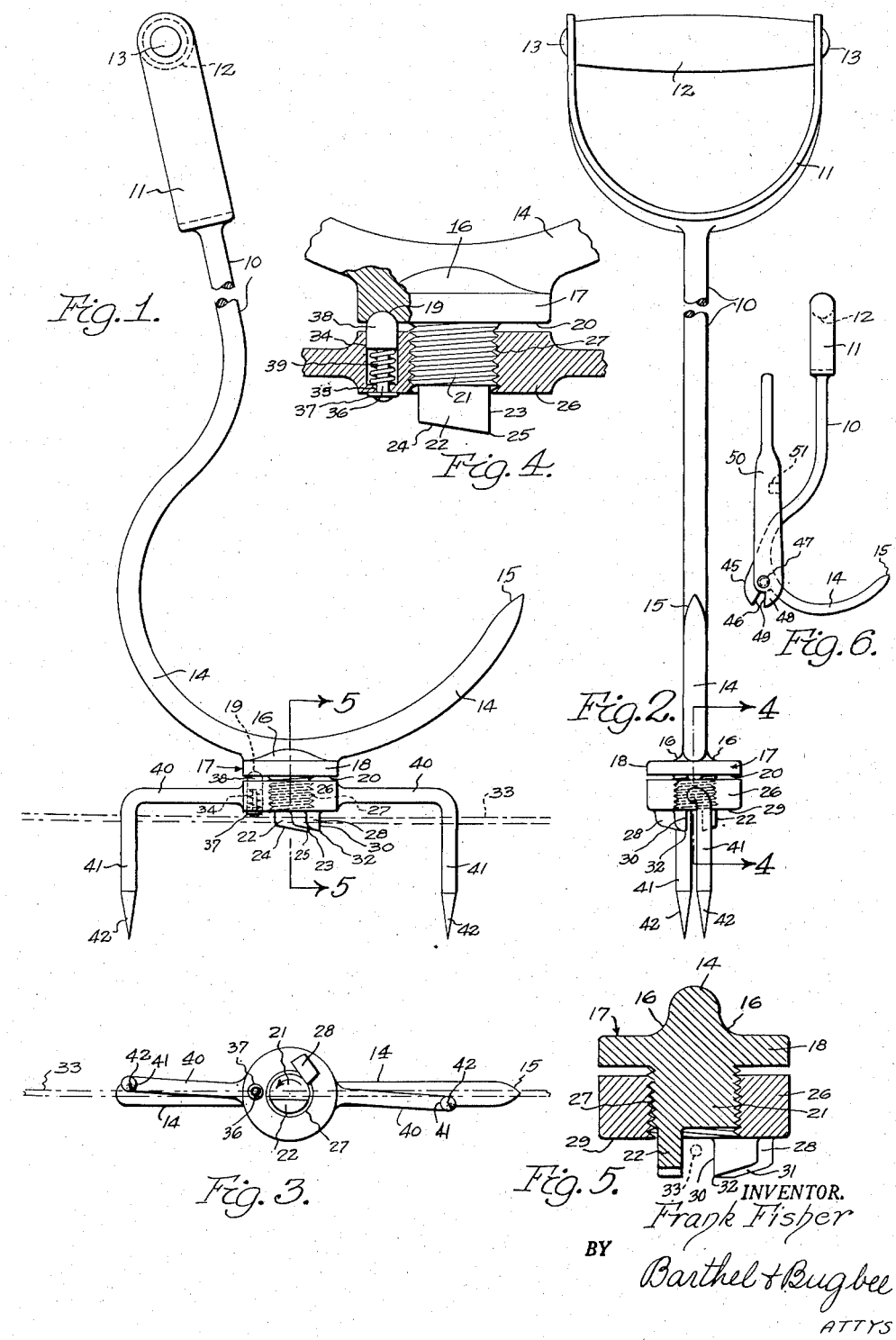

Patented Nov. 20, 1951

2,575,948

UNITED STATES PATENT OFFICE 2,575,948

BALING WIRE CUTTER

Frank Fisher, Owosso, Mich.

Application August 24, 1946, Serial No. 692,769

5 Claims. (Cl. 30—124)

1

This invention relates to tools and in particular to hand hooks for handling commodities such as hay, cotton or the like, especially when such commodities are in bales.

One object of this invention is to provide a handling hook having means associated therewith for quickly and accurately cutting the baling wire around the bale or bundle of material.

Another object is to provide a handling hook wherein the hook itself serves as one of two relatively movable wire cutting members for cutting the baling wire.

Another object is to provide a handling hook as set forth in the preceding objects wherein the bottom of the hook is provided with a stationary cutter and a rotary cutter mounted adjacent the stationary cutter with prong for entering the bale of material so that the user with one hand can rotate the hook to cut the baling wire and then can handle the material without shifting his grip.

Another object is to provide a handling hook, as set forth in the preceding objects, wherein the shank of the hook forms one arm of a pair of cutting pliers, the other arm of which is pivoted to the shank so that the operator can cut the wire by squeezing the movable arm against the shank of the hook.

Other objects and advantages of the invention will become apparent during the course of the following description of the accompanying drawings, wherein:

Figure 1 is a side elevation of a handling hook according to a preferred form of the invention;

Figure 2 is a right-hand side elevation of the handling hook shown in Figure 1;

Figure 3 is a bottom plan view of the handling hook shown in Figures 1 and 2;

Figure 4 is an enlarged fragmentary vertical section taken along the line 4—4 in Figure 2, showing the detent mechanism;

Figure 5 is a vertical section along the line 5—5 in Figure 1, showing the cutting blades and their connection to the hook; and Figure 6 is a side elevation of a handling hook according to a modification of the invention.

Referring to the drawings in detail, Figure 1 shows a handling hook for use in handling material, preferably in bales, as consisting of a shank 10 having a U-shaped member 11 secured to the end thereof and having a hand grip 12 extending between the ends of the member 11 and secured thereto as by upsetting or enlarging the ends 13 thereof. The shank 10 extends downward to form the hook portion 14 of partially

2 circular shape and terminating in a pointed tip 15.

Secured approximately at the bottom of the hook portion 14, as by welding at the points 16, is a cutter support 17 having a disc-shaped upper portion 18 with a detent recess 19 (Figure 4) in the lower surface 20 thereof. Extending downwardly from the lower surface 20 is a threaded stud or boss 21 terminating in a cutting blade 22 having a vertical cutting edge 23 thereon, the blade 22 being backed off on its bottom edge 24 in an oblique direction to provide a material penetrating point 25 for facilitating insertion of the cutting blade 22 into the material so as to obtain a firm grip on the baling wire. Cooperating with the blade 22 is a collar 26 having a threaded bore 27 threaded upon the threaded boss 21 and having a rotary blade 28 extending downward from the lower surface 29. The blade 28 is provided with a forward cutting edge 30 similar to the cutting edge 23 and similarly backed off on its bottom edge 31 to provide a similar penetrating tip 32. The cutting blades 22 and 28 are both mounted eccentric of the axis of rotation of the collar 26, so that they exert a cutting action upon a wire 33 (Figure 5) placed between the cutting edges 23 and 30.

The collar 26 is provided with a socket 34 (Figure 4) continuing in a bore 35 through which passes a pin 36. The pin 36 is provided with a washer 37 held thereon by enlarging the lower end of the pin 36. Mounted on the upper end of the pin 36 is a detent member 38 which is urged upward by a coil spring 39 encircling the pin 36 and mounted in the socket 34. Consequently, when the collar 26 is rotated until the detent member 38 reaches the detent recess 19, the coil spring 39 urges the member 38 into the recess 19, releasably holding the parts together. Extending diametrically outward from the collar 26 are two arms 40 having bent portions 41 terminating in points 42.

In the operation of the handling hook shown in Figures 1 to 5 inclusive, the operator carries the hook by grasping the handle 12 as he walks to the place where the material, such as baled hay, is stored. He then selects a bale which he wishes to use and pulls it down by means of the hook portions 14, 15. To cut the baling wire 33, he plunges the points 42 and portions 41 of the arms 40 downward into the hay on opposite sides of the baling wire so that the wire 33 passes into the space between the cutting edges 23 and 30 of the cutting blades 22 and 28 (Figures 1, 3 and 5). At the same time, the points 25 and 32 thereof are pushed downward into the hay so that the wire 33 is lodged high in the space between the blades.

With the blade 28 thus firmly anchored by means of the arm portions 41 deeply embedded in the hay or other material, the operator then turns the handle 12 so as to rotate the hook portion 14 and cutter support 17, moving the detent member 38 out of its recess 19 and swinging the cutting blade 22 against the wire 33 and forcing the latter against the cutting blade 23, severing the wire. The operator then rotates the hook portion 14 in the reverse direction to return the arms 40 to the position shown in Figure 3, seating the detent member 38 again in its recess 19. A slight pull on the handle 12 dislodges the arm portions 41 from the hay and the hook is again ready for use elsewhere.

The modification shown in Figure 6 is similar in purpose to the form of the invention shown in Figures 1 to 5 inclusive and consists of a similar shank 10, U-shaped member 11, handle 12, hook portion 14 and point 15. Secured as by welding to the hook portion 14 intermediate the point 15 and shank 10 is a fixed cutting blade 45 having a cutting edge 46 and also carrying a pivot fastener 47. Pivotally mounted on the pivot fastener 47 is a movable cutting blade 48 having a cutting edge 49 cooperating with the cutting edge 46 to cut the baling wire 33. A handle 50 is formed preferably integral with the cutting blade 48 and extends approximately parallel to the shank 10 so that the two can be gripped by the fingers of the operator. A stop 51 welded or otherwise secured to the handle 50 engages the hook portion 14 or shank 10 immediately after the cutting edges 46 and 49 have passed one another in a shearing action to sever the wire, thereby preventing the handle 50 from approaching close to the shank 10 and pinching the fingers of the user.

In the operation of the modified handling hook shown in Figure 6, the operator, as before, pulls down a bale of hay or other material by plunging the hook portion 14 into it and pulling upon the handle 12. He then removes the hook portion 14 from the material and, with the handle 50 moved apart from the shank 10 into the position shown in Figure 6 with the cutting edges 46 and 49 apart, he moves these down over the wire 33. He then squeezes the handle 50 toward the shank 10, causing the movable cutting blade 48 to move past the cutting blade 46 in a shearing action, severing the wire 33 between the cutting edges 46 and 49.

While I have shown and described my invention in detail, it is to be understood that the same is to be limited only by the appended claims, for many changes may be made without departing from the spirit and scope of my invention.

What I claim is:

1. A baling wire cutter comprising an elongated member having a handle disposed transversely to the upper end thereof, a pivot member fixedly mounted on said elongated member remote from said handle with its pivot axis disposed in the same general direction as the axis of the upper portion of said elongated member, a first cutting element fixedly mounted on one of said members eccentrically of said pivot axis, an independently movable member rotatably mounted on said pivot member on an axis coaxial with said pivot axis, a second cutting element mounted on said movable member eccentrically of the pivot axis thereof and cooperable with said first cutting element to cut the baling wire therebetween, and a bale-penetrating member projecting from said movable member and adapted to anchor said movable member to the bale during the cutting operation.

2. A baling wire cutter comprising an elongated member having a handle disposed transversely to the upper end thereof, a pivot member fixedly mounted on said elongated member remote from said handle with its pivot axis disposed in the same general direction as the axis of the upper portion of said elongated member, a first cutting element fixedly mounted on one of said members eccentrically of said pivot axis, an independently movable member rotatably mounted on said pivot member on an axis coaxial with said pivot axis, a second cutting element mounted on said movable member eccentrically of the pivot axis thereof and cooperable with said first cutting element to cut the baling wire therebetween, a bale-penetrating member projecting from said movable member and adapted to anchor said movable member to the bale during the cutting operation, and a yieldable detent mounted on one of said members and releasably engaging the member movable relatively thereto.

3. A baling wire cutter comprising an elongated member having a handle disposed transversely to the upper end thereof, a pivot member fixedly mounted on said elongated member remote from said handle with its pivot axis disposed in the same general direction as the axis of the upper portion of said elongated member, a first cutting element fixedly mounted on one of said members eccentrically of said pivot axis, an independently movable member rotatably mounted on said pivot member on an axis coaxial with said pivot axis, a second cutting element mounted on said movable member eccentrically of the pivot axis thereof and cooperable with said first cutting element to cut the baling wire therebetween, and a bale-penetrating member projecting from said movable member and adapted to anchor said movable member to the bale during the cutting operation, said bale-penetrating member comprising a pointed arm projecting outwardly and downwardly from said movable member.

4. A baling wire cutter comprising an elongated member having a handle disposed transversely to the upper end thereof, a pivot member fixedly mounted on said elongated member remote from said handle with its pivot axis disposed in the same general direction as the axis of the upper portion of said elongated member, a first cutting element fixedly mounted on one of said members eccentrically of said pivot axis, an independently movable member rotatably mounted on said pivot member on an axis coaxial with said pivot axis, a second cutting element mounted on said movable member eccentrically of the pivot axis thereof and cooperable with said first cutting element to cut the baling wire therebetween, and a bale-penetrating member projecting from said movable member and adapted to anchor said movable member to the bale during the cutting operation, said bale-penetrating member being approximately U-shaped with the connecting portion thereof extending outwardly from said movable member and the arms thereof extending downwardly from said connecting portion, said arms being pointed.

5. A baling wire cutter comprising an elongated member having a handle disposed transversely to the upper end thereof, a pivot member fixedly mounted on said elongated member remote from said handle with its pivot axis disposed in the same general direction as the axis of the upper portion of said elongated member, a first cutting element fixedly mounted on one of said members eccentrically of said pivot axis, an independently movable member rotatably mounted on said pivot member on an axis coaxial with said pivot axis, a second cutting element mounted on said movable member eccentrically of the pivot axis thereof and cooperable with said first cutting element to cut the baling wire therebetween, and a bale-penetrating member projecting from said movable member and adapted to anchor said movable member to the bale during the cutting operation, said bale-penetrating member comprising a pointed approximately L-shaped arm projecting outwardly and downwardly from said movable member.

FRANK FISHER.

REFERENCES CITED

The following references are of record in the file of this patent:

UNITED STATES PATENTS

| Number | Name | Date |
| --- | --- | --- |
| 774,646 | Cady | Nov. 8, 1904 |
| 877,619 | Vasey | Jan. 28, 1908 |
| 1,045,396 | Grogan | Nov. 26, 1912 |
| 1,498,865 | Pierce | May 20, 1924 |
| 2,387,633 | Alpert | Oct. 23, 1945 |